United States Patent
Adams et al.

(10) Patent No.: US 9,404,256 B2
(45) Date of Patent: Aug. 2, 2016

(54) STOWAGE AND DEPLOYMENT OF SLIT TUBE BOOMS

(71) Applicant: Composite Technology Development, Inc., Lafayette, CO (US)

(72) Inventors: Larry Adams, Thornton, CO (US); Dana Turse, Broomfield, CO (US); Doug Richardson, Westminster, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 0 days.

(21) Appl. No.: 14/681,571

(22) Filed: Apr. 8, 2015

(65) Prior Publication Data

US 2015/0284955 A1    Oct. 8, 2015

Related U.S. Application Data

(60) Provisional application No. 61/976,890, filed on Apr. 8, 2014.

(51) Int. Cl.
*E04C 3/00* (2006.01)

(52) U.S. Cl.
CPC ........... *E04C 3/005* (2013.01); *Y10T 29/49826* (2015.01)

(58) Field of Classification Search
CPC ..... E04C 3/005; E04C 3/28; E04C 2003/043; E04C 2003/0447; Y10T 29/49826; Y10T 29/49833
USPC ............... 52/108, 632, 645, 646; 244/172.6
See application file for complete search history.

(56) References Cited

U.S. PATENT DOCUMENTS

| | | | | |
|---|---|---|---|---|
| 3,144,104 A * | 8/1964 | Weir | ............. | E04C 3/005 182/41 |
| 3,608,844 A * | 9/1971 | Tumulty, Jr. | ............. | E21C 47/18 242/373 |
| 4,587,777 A * | 5/1986 | Vasques | ............. | B64G 9/00 244/172.6 |
| 4,834,325 A * | 5/1989 | Faget | ............. | B64G 1/12 136/245 |
| 4,991,799 A * | 2/1991 | Petro | ............. | B64G 1/10 244/14 |
| 5,235,788 A * | 8/1993 | Maimets | ............. | B64G 4/00 244/172.6 |
| 6,217,975 B1 * | 4/2001 | Daton-Lovett | ......... | B65G 15/08 156/161 |
| 6,256,938 B1 * | 7/2001 | Daton-Lovett | ........ | F16H 19/064 138/119 |
| 2014/0230949 A1 * | 8/2014 | Daton-Lovett | ......... | B64G 1/222 138/177 |
| 2015/0068764 A1 * | 3/2015 | Lastra | ............. | E21B 23/01 166/378 |
| 2015/0368903 A1 * | 12/2015 | Turse | ............. | B65H 75/4402 242/407 |

* cited by examiner

Primary Examiner — Brent W Herring
(74) Attorney, Agent, or Firm — Maschoff Brennan

(57) ABSTRACT

A system comprising a boom having a first end, a longitudinal length, and a slit that extends along the longitudinal length of the boom; a drum having an elliptic cross section and a longitudinal length; an attachment mechanism coupled with the first end of the boom and the drum such that the boom and the drum are substantially perpendicular relative to one another; an inner shaft having a longitudinal length, the inner shaft disposed within the drum, the longitudinal length of the inner shaft is aligned substantially parallel with the longitudinal length of the drum, the inner shaft at least partially rotatable relative to the drum, and the inner shaft is at least partially rotatable with the drum; and at least two cords coupled with the inner shaft and portions of the boom near the first end of the boom.

9 Claims, 10 Drawing Sheets

STOWAGE AND DEPLOYMENT OF SLIT TUBE BOOMS

GOVERNMENT RIGHTS

This invention was made with government support under contract number NNX12CA80C awarded by the National Aeronautics and Space Administration (NASA). The government has certain rights in the invention.

BACKGROUND

Deployable structures can be used in many terrestrial and celestial applications. In space, for example, booms may be deployed with solar panels. Terrestrially, for example, booms may be used to deploy various structures. There are a number of different types and/or configurations of booms that are currently used in the art.

SUMMARY

Embodiments of the invention include a system that can deploy and/or stow a boom using a single action. In the deployed configuration the boom may have a circular or semicircular cross section and a slit along the longitudinal length of the boom. In the stowed configuration the boom may be flattened and wrapped around a drum. The drum may include an inner shaft that is partially rotatable within the drum and relative to the drum. For example, the inner shaft may not rotate more than 360 degrees within the drum and relative to the drum. As another example, the inner shaft may be rotatable within the drum for less than 360 degrees relative to the drum prior to the drum and the shaft rotating together. In some embodiments, the inner shaft may be coupled with corners of the boom. The boom may transition from the deployed configuration to the stowed configuration by rotating the inner shaft thereby pulling the cords and flattening portions of the boom. Once flattened the drum may rotate with the boom rolling the flattened boom into the stowed configuration.

Some embodiments include a system comprising a boom, an attachment mechanism, a drum, an inner shaft, and at least two cords. The boom may include a first end, a longitudinal length, and a slit that extends along the longitudinal length of the boom. The drum may include an elliptic cross section and a longitudinal length. The attachment mechanism may couple the first end of the boom and the drum such that the boom and the drum are substantially perpendicular relative to one another. The inner shaft may include a longitudinal length and may be disposed within the drum. The longitudinal length of the inner shaft may be aligned substantially parallel with the longitudinal length of the drum. The inner shaft may be at least partially rotatable relative to the drum. The inner shaft may be at least partially rotatable with the drum. The at least two cords may be coupled with the inner shaft and portions of the boom near the first end of the boom.

Some embodiments include a method comprising disposing an inner shaft within a drum such that the inner shaft and the drum are substantially parallel; coupling a first end of a boom with an outer surface of the drum, wherein the boom comprises a slit that extends along a longitudinal length of the boom; coupling a first cord with a first corner portion of the first end of the boom and a portion of the inner shaft; and coupling a second cord with a second corner portion of the first end of the boom and another portion of the inner shaft.

In some embodiments, the method may also include disposing the first cord through a first hole in the drum; and disposing the second cord through a second hole in the drum.

In some embodiments, the method may also include rotating the inner shaft relative to the drum so that the first cord wraps around the inner shaft and pulls on the first corner portion of the first end of the boom and so that the second cord wraps around the inner shaft and pulls on the corner portion of the first end of the boom causing the boom to flatten near the first end of the boom; engaging the inner shaft with the drum; and rotating the inner shaft and the drum so that the boom flattens and wraps around the outer surface of the drum.

In some embodiments, the engaging the inner shaft with the drum further comprises engaging shaft pin coupled with the inner shaft with a drum pin coupled with the drum. In some embodiments, rotating the inner shaft relative to the drum further comprises rotating the inner shaft relative to the drum less than 360 degrees.

Some embodiments include a method comprising rotating an inner shaft relative to a drum within which the inner shaft is disposed so that a first cord coupled with the inner shaft and a first corner portion of a boom wraps around the inner shaft and pulls on the first corner portion of the boom and a second cord coupled with the inner shaft and a second corner portion of the boom wraps around the inner shaft and pulls on the second corner portion of the boom; engaging the drum with the inner shaft; and rotating the inner shaft and the drum so that the boom and wraps around an outer surface of the drum.

In some embodiments, rotating the inner shaft relative to the drum may further comprises rotating the inner shaft relative to the drum less than 360 degrees. In some embodiments, the boom may include a slit extending along a longitudinal length of the boom and a first end. In some embodiments, the first corner portion of the boom is located near a portion of the first end of the boom and a portion of the slit and the second corner portion of the boom is located near a portion of the first end of the boom and a portion of the slit.

In some embodiments, the boom may include a slit that extends along a longitudinal length of the boom and a first end. In some embodiments, the boom is flattened when it is wrapped around the outer surface of the drum.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

A boom (or longerons) can be used in various configurations to deploy various structures. A boom can be used in terrestrial or celestial applications and/or may be used in conjunction with other booms. A boom may have a slit that extends along the longitudinal length of the boom so that the boom may be flattened and rolled for stowage and then deployed by unrolling the boom. Some embodiments include systems and methods for retracting, rolling and/or stowing a boom.

Figure 1:
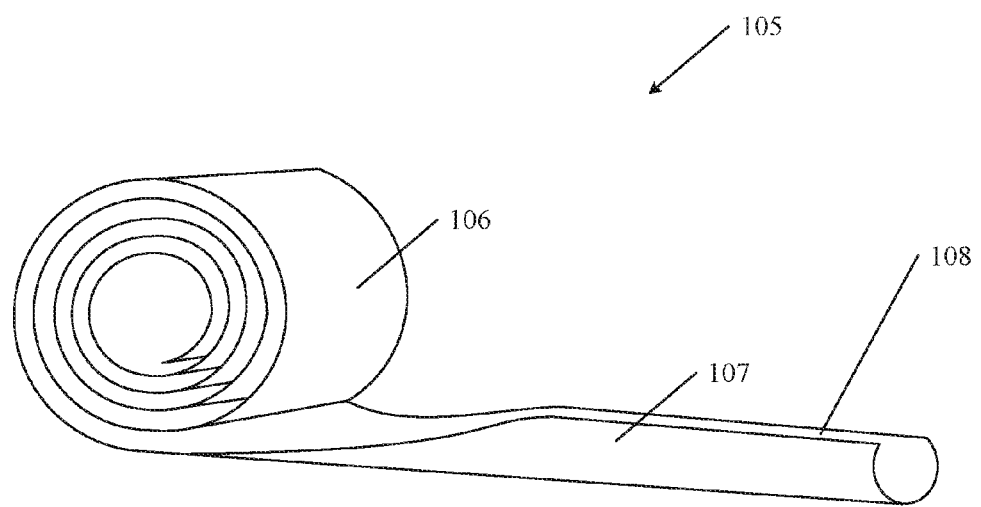
FIG. 1 shows an example boom having a tubular shape in the deployed configuration and flattened and rolled shape in the stowed configuration according to some embodiments.

FIG. 1 illustrates an example boom 105. The boom 105 can be flattened and rolled for stowage and then regain its original, unflattened, circular, elliptical, or semi-circular cross-section during deployment. The boom 105 may include a long tube with one or more slits 108 or gaps that extend through all or a portion of the longitudinal length of the boom 105. The boom 105 may include a hollow interior. The slit 108 may allow the boom 105 to be flattened and rolled into a stowed or rolled configuration or extended in a deployed configuration. When rolled, various different booms may be stacked, nested, aligned and/or combined and collectively rolled together. The boom 105 may be constructed from any type of material that may, for example, include metal, graphite, fiber, resins, shape memory materials, composite materials, polymers, etc. In some embodiments, the boom 105 may be constructed from a composite material with a number of plies embedded with a resin.

The boom 105 may have a tubular shape in the deployed configuration and flattened and rolled in the stowed configuration. When rolling a boom 105, the tubular cross-section of the boom 105 can be flattened and/or the boom 105 may be opened along the longitudinal length of the boom 105. The boom 105 can then be rolled into a stowed configuration. In some embodiments, during stowage, portions of the boom 105 may be progressively flattened as the boom 105 is rolled up. In some embodiments, multiple booms can be stacked upon one another, nested or embedded within each other in the tubular or deployed configuration. The combined boom stack can then be rolled along the longitudinal length of the booms into the stowed configuration.

In some embodiments, the boom 105 may include more than one slit along the longitudinal length of the boom 105.

Figure 2A:
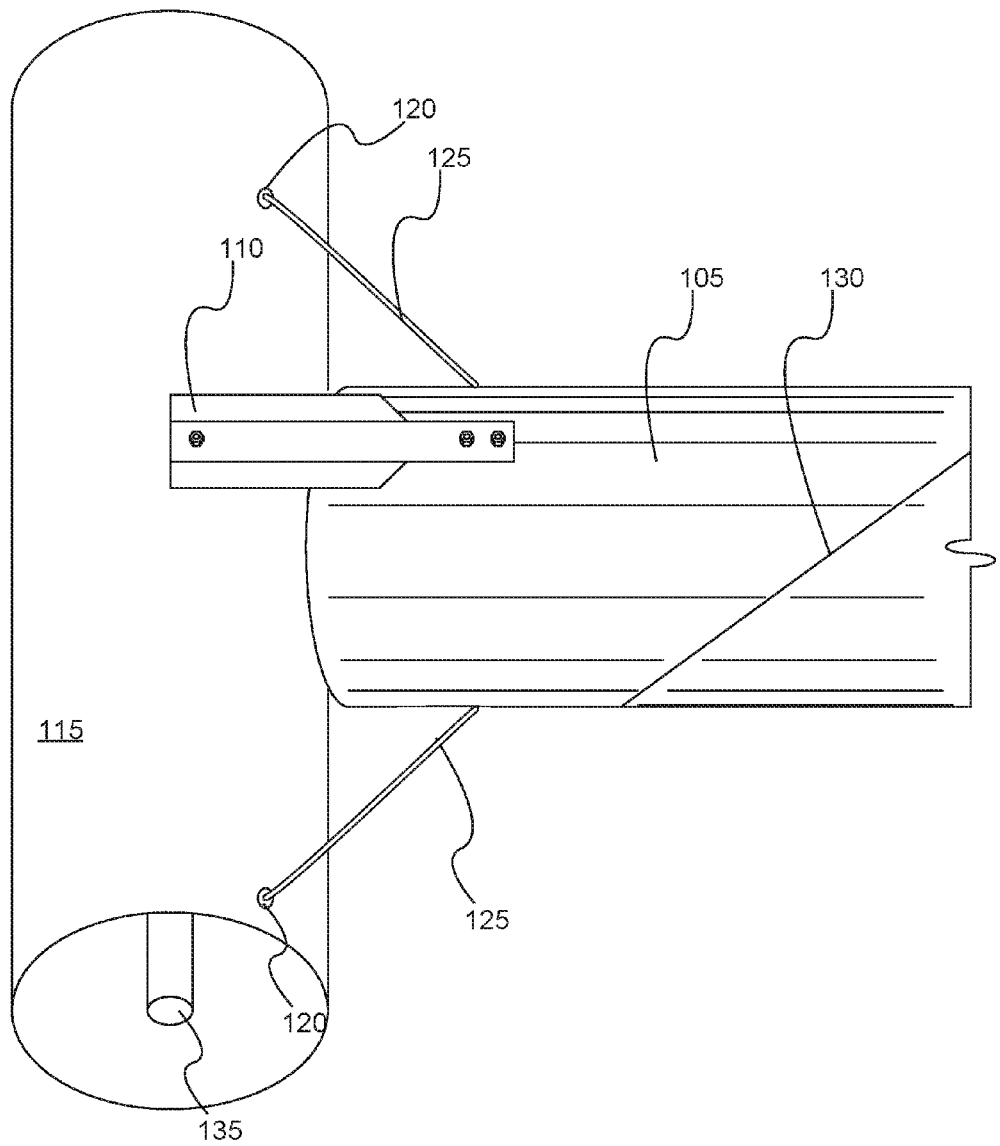
FIGS. 2A and 2B illustrate a deployment and stowage system for booms according to some embodiments.

FIG. 2A illustrates a deployment and stowage system 100 for a boom 105 according to some embodiments. The deployment and stowage system 100 may be used to open (and/or widen) the slit of the boom 105 in order to flatten and roll the boom 105 onto a drum 115. The drum 115, for example, may include a tube or cylinder with a hollow interior and/or may have a circular, semi-circular, or elliptical cross section. The drum 115, for example, may include an outer surface.

In some embodiments, the end of the boom 105 nearest a drum 115 may include fewer plies than the rest of the boom 105 to allow the end portion of the boom 105 to more easily open and flatten. Line 130, for example, shows where the change from more to less plies occur within the boom 105. The boom 105 may be coupled with the drum 115 in any number of ways such as, for example, with an attachment mechanism 110. The attachment mechanism 110 may include, for example, a strip of metal or spring steel, composite material, etc. The attachment mechanism 110, for example, may be flexible enough to wrap around the drum 115 and/or be strong enough to pull the boom 105 as the drum 115 begins to roll.

In some embodiments, an inner shaft 135 may be disposed within the drum 115. The inner shaft 135, for example, may have a longitudinal length that is substantially parallel with the longitudinal length of the drum 115. In some embodiments, the inner shaft 135 may be placed within one or more bearings coupled with the drum 115.

The cords 125 may be coupled with the boom 105 at two different end corners 127 of the boom 105. The cords 125 may also be coupled with the inner shaft 135. The cords 125 may include rope, fabric, string, etc. The cords 125 also pass through holes 120 within the drum 115 and may be coupled with an inner shaft 135 (see FIG. 4).

In some embodiments, the end corners 127 may be adjacent with a longitudinal end of the boom 105 and the slit 108. The end corners 127 may be folded over, for example, to provide reinforcement for the attachment of the cord 125. The end corners 127 may, for example, be reinforced with additional material such as, for example, additional composite material. The end corners 127 may, for example, may include one or more grommets and/or holes. The end corners 127 may, for example, have rounded or mitered corners. Examples of the end corners 127 are shown in FIGS. 3A-3D.

Figure 2B:
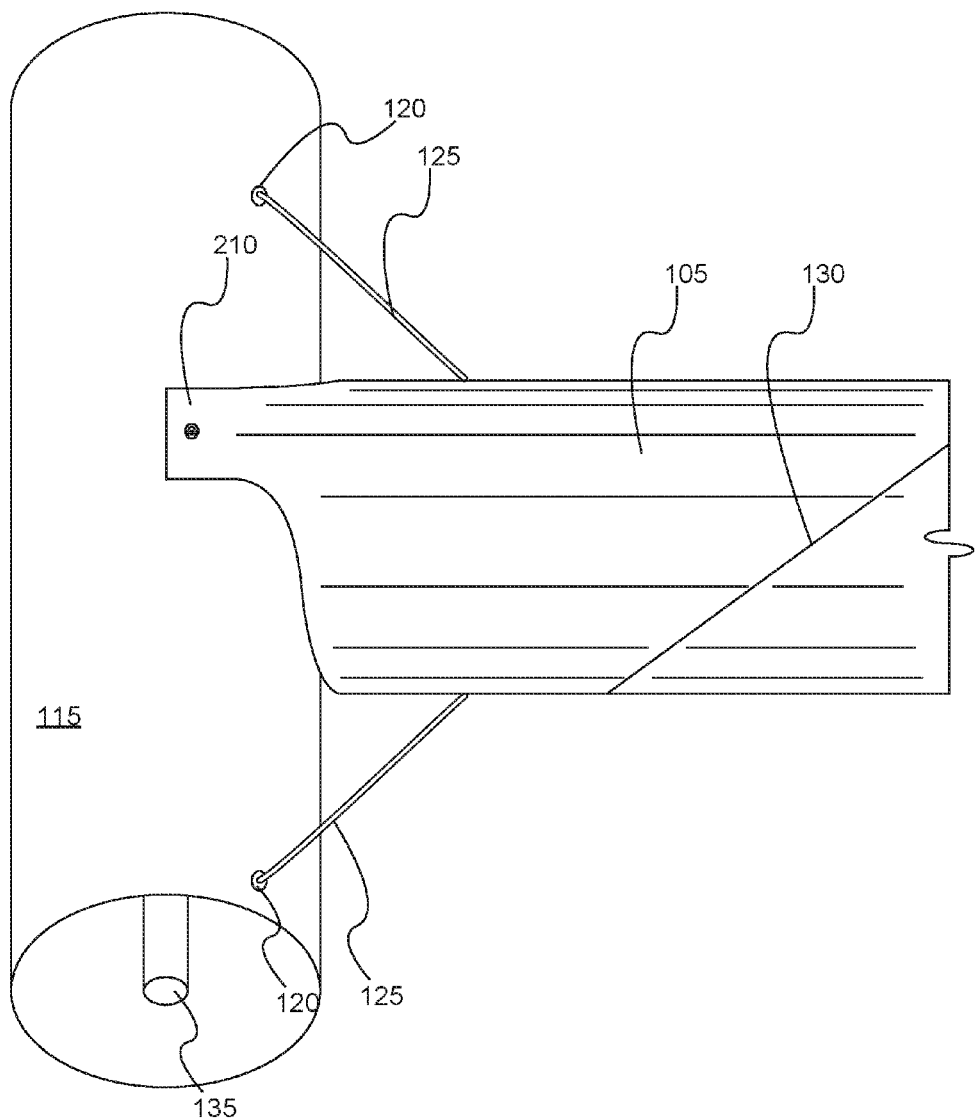

FIG. 2B illustrates another deployment and stowage system 100. In this embodiment, the boom 105 includes an attachment member 210 that is integral with the boom 105. For example, the attachment member 210 may be a tab that extends from the boom 105. In some embodiments, the attachment member 210 may be formed by cutting the attachment member 210 shape and/or form into or from the boom 105.

Figure 3A:
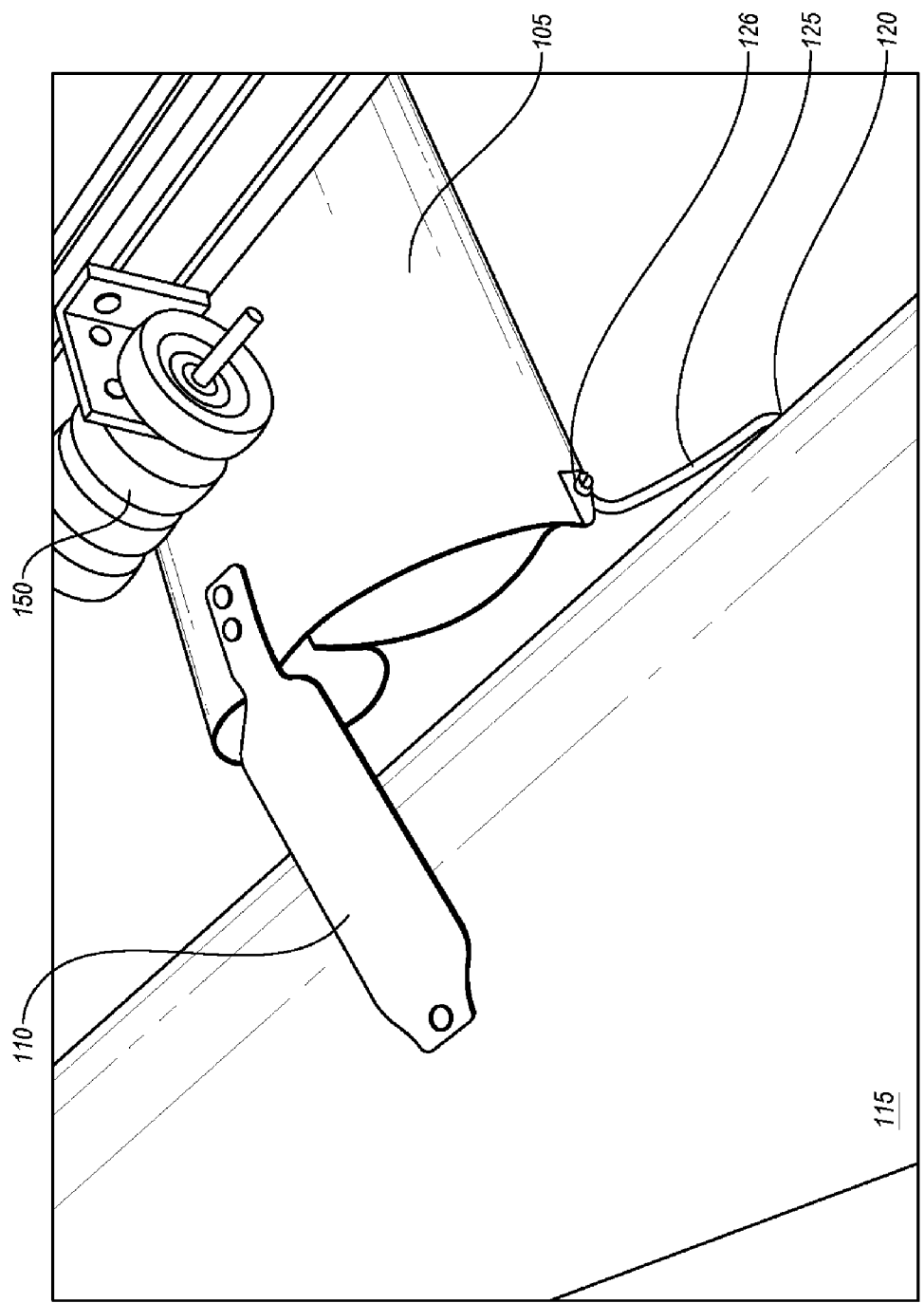
FIGS. 3A-3D illustrate examples of the boom transitioning from a deployed configuration to a stowed configuration according to some embodiments.

FIGS. 3A, 3B, 3C, and 3D show a boom 105 transitioning from a being in a deployed state in FIG. 3A and the beginning of rolling the boom 105 into a stowed state.

In some embodiments, to begin flattening the boom 105 in preparation for rolling the boom 105 on the drum 115, the cords 125 are engaged to pull the two end corners 127 of the boom 105 in somewhat opposite lateral directions. The lateral direction is a direction that is substantially perpendicular with the longitudinal length of the boom 105. The inner shaft 135 may be coupled with a motor that may rotate the inner shaft 135 causing the cords 125 to be wound at least partially around the inner shaft 135. As the cords 125 wrap around the inner shaft 135, the cords 125 pull the end corners 127 of the boom 105 and opens and/or flattens one end portion of the boom 105 along a portion of the slit 108.

FIG. 3A shows the boom 105 coupled with the drum 115 in the deployed configuration. In some embodiments, in the deployed configuration, the cords 125 may not be pulling the end corners 127. The boom 105 is coupled with the drum 115 with the attachment mechanism 110. The boom 105 is substantially perpendicular with the drum 115.

Figure 3B:
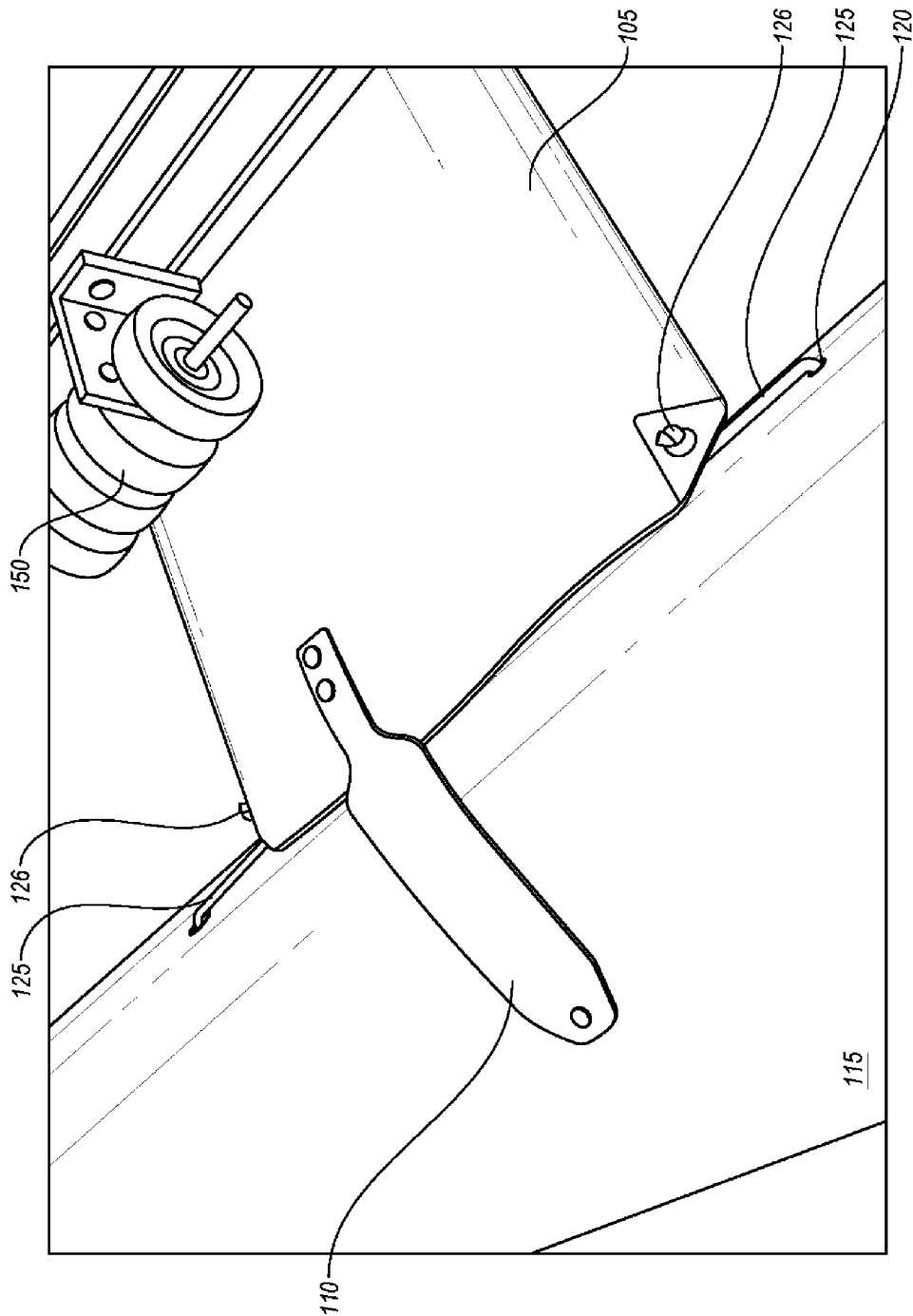

FIG. 3B shows the boom 105 coupled with the drum 115. In this state, the inner shaft 135 may be rotated so that the cords 125 begin to wrap or partially wrap around the inner shaft 135. The cords 125 may then provide tension that pulls the end corners 127 laterally and open and/or flattens the boom 105 in preparation for flattening and/or rolling of the boom 105 on the drum 115.

Figure 3C:
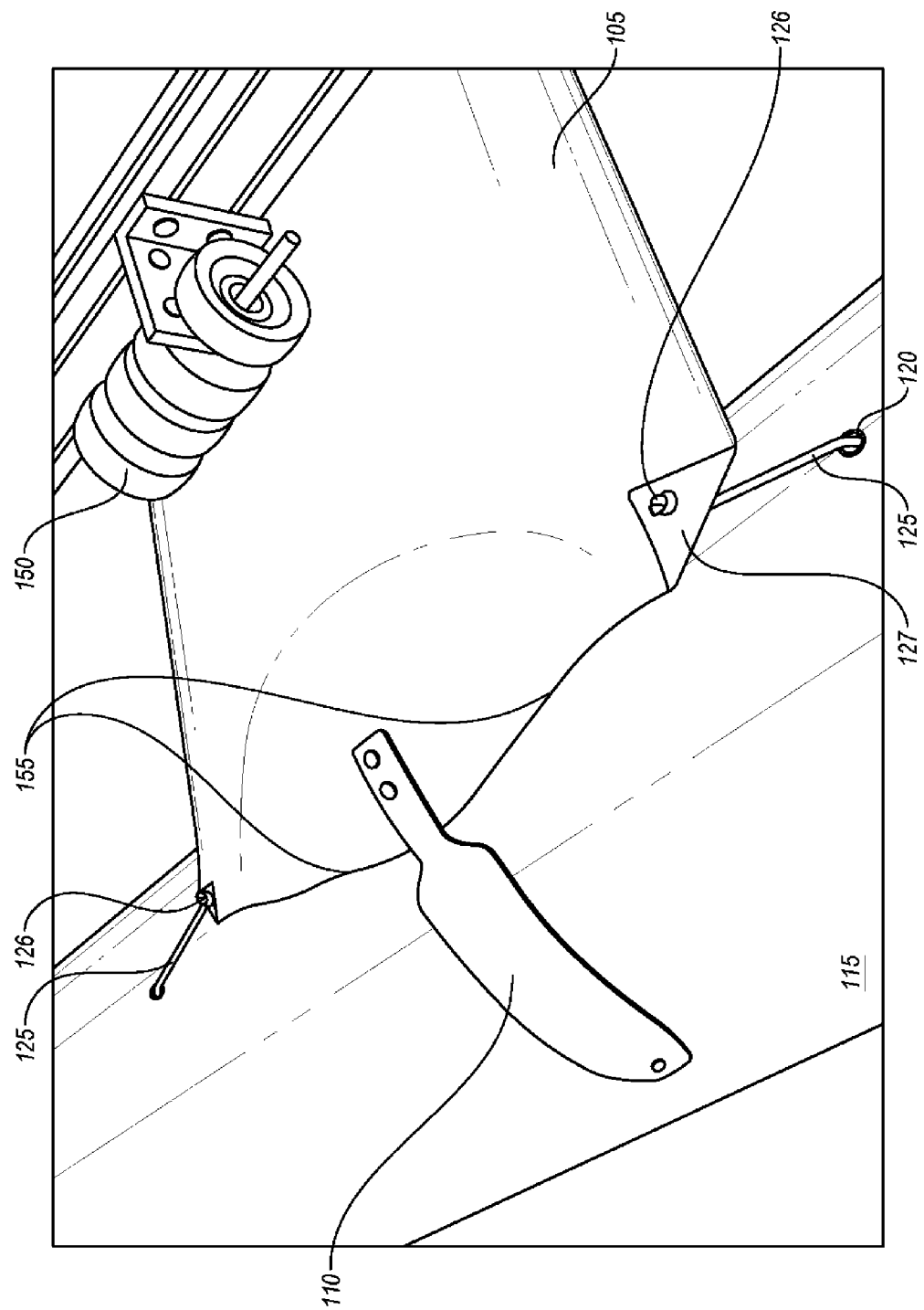

The inner shaft 135 may continue to rotate and have the cords 125 wrap further around the inner shaft 135. FIG. 3C shows the end corners 127 pulled by the cords 125 to flatten the end of boom 105. Moreover, at this point the drum 115 may begin rotating (counter clockwise), which pulls the attachment mechanism 110 and/or the boom 105 onto the drum 115. In some embodiments, the inner shaft 135 may continue to be rotated by a motor. A shaft pin on the inner shaft 135 may engage a drum pin coupled with the drum 115 may cause the inner shaft 135 to rotate the drum 115 with the inner shaft 135.

Figure 3D:
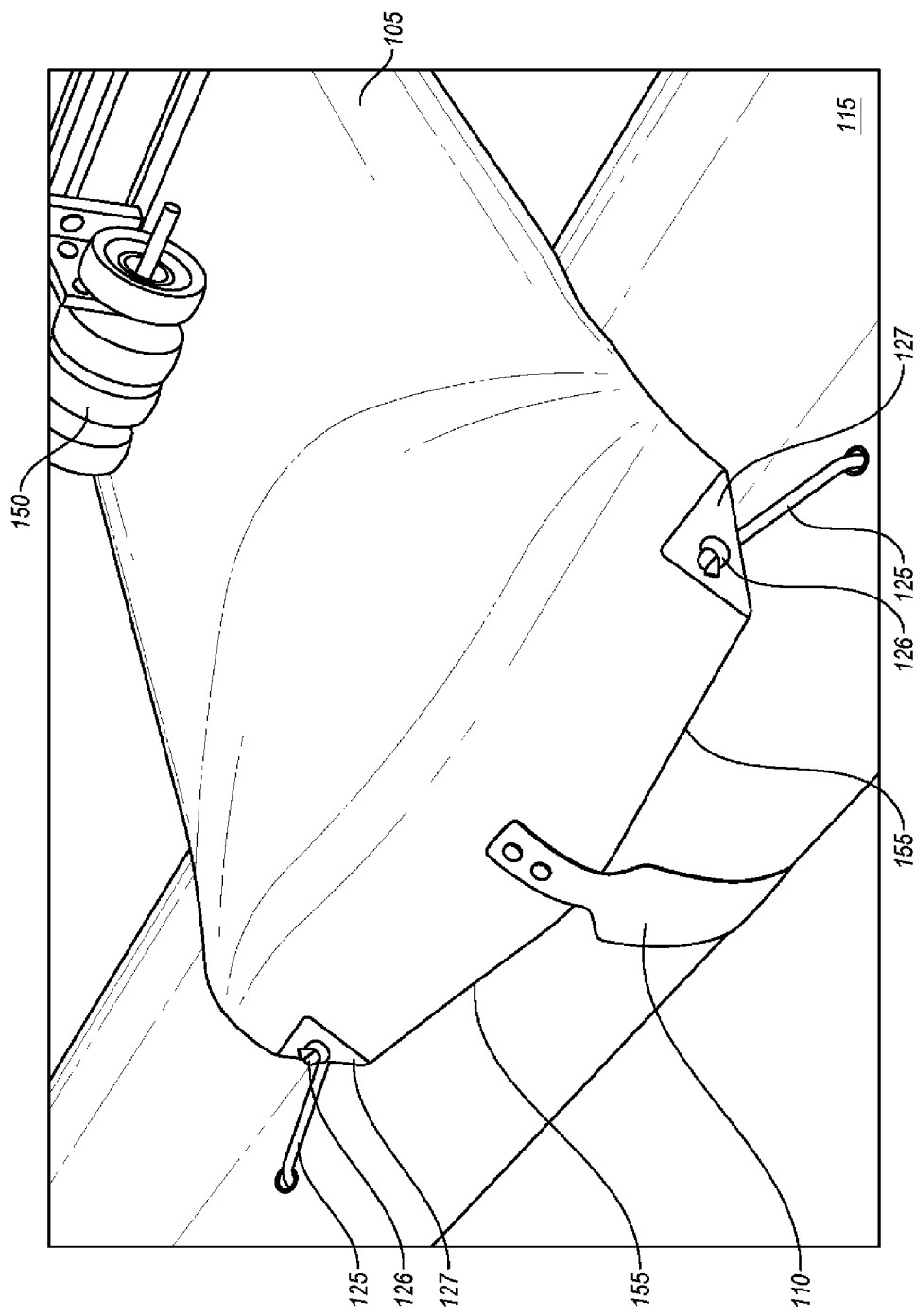

FIG. 3D shows the end of the boom 105 being rolled around the drum 115 as the drum 115 continues to rotate. The boom 105 will continue to flatten and be wound around the drum 115 until the boom 105 is flattened and rolled on the drum 115 or until the motor stops rotating the inner shaft 135.

In some embodiments, the edge 155 of the boom 105 near where the boom 105 is coupled with the drum 115 may be tapered or angled from the middle of the edge of the boom 105 toward the end corners 127 as shown in FIG. 3C and FIG. 3D.

Figure 4A:
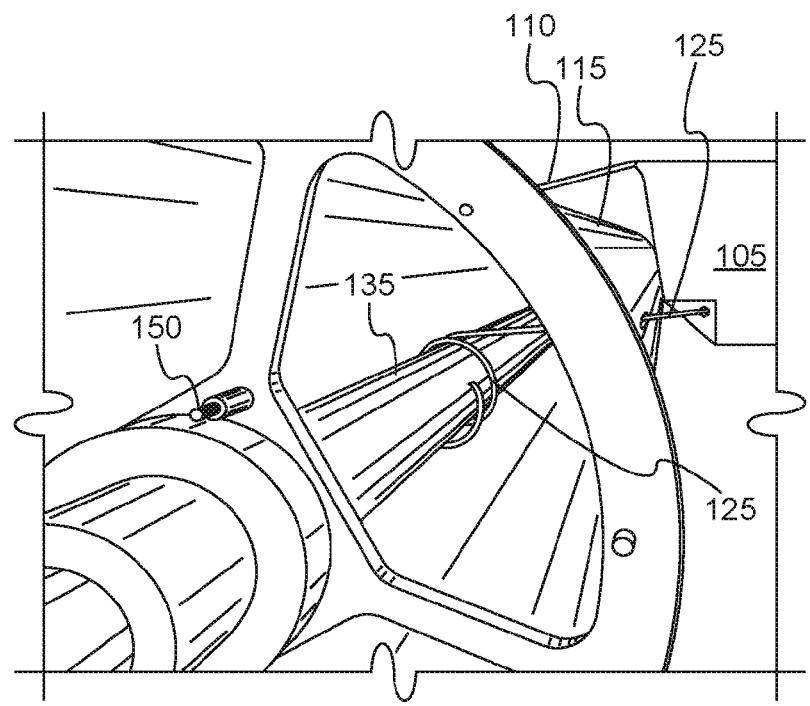
FIGS. 4A and 4B illustrate a side view of a drum according to some embodiments.
Figure 4B:
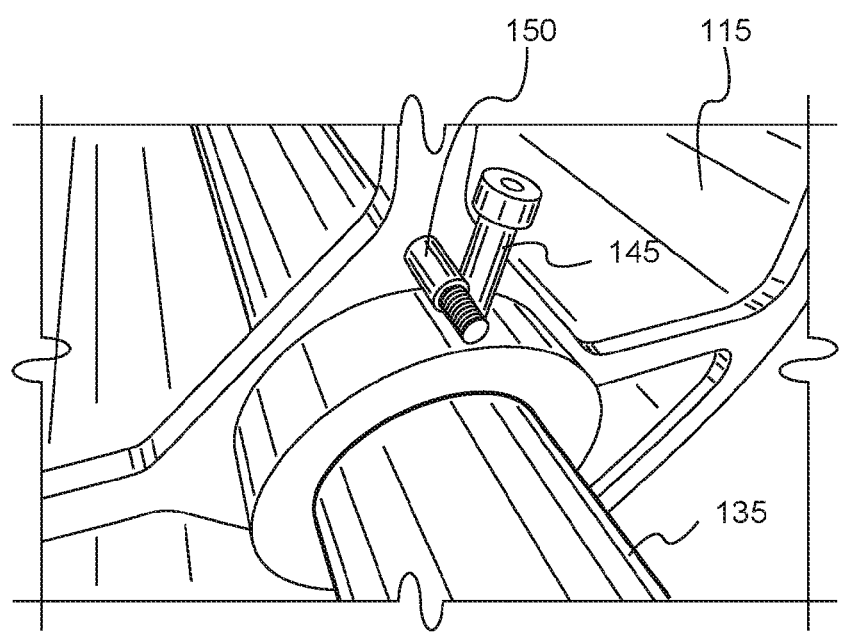

FIG. 4A and FIG. 4B show a side view of the drum 115 and the boom 105. FIG. 4 also shows the inner shaft 135 disposed within the hollow interior of the drum 115 such that the inner shaft 135 is oriented substantially parallel with the drum 115. The inner shaft 135, for example, may rotate at least partially freely relative to the drum 115 and within a bearing of the drum 115. The inner shaft 135 may rotate freely within the bearing of the drum 115 and with respect to the drum 115 until a shaft pin 145 coupled with the inner shaft 135 engages a drum pin 150 coupled with the drum 115. After engagement of the shaft pin 145 with the drum pin 150, the drum 115 may rotate with the inner shaft 135.

The cords 125 are connected with the inner shaft 135 inside of the drum 115 as shown in FIG. 4A. One end of each cord 125 may pass through a hole 120 in the drum 115 and be coupled with a corner of the boom 105. The other end of each of the cords 125 may be coupled with the inner shaft 135 such that when the inner shaft 135. Prior to engagement of the shaft pin 145 with the drum pin 150 the inner shaft 135 may rotate freely and may be rotated to wind the cords 125 around the inner shaft 135. Tension may then be applied to the cords 125 from the wrapping of the cords 125 around the inner shaft 135. This tension in the cords 125 may pull the end corners 127 of the boom 105 and flatten the end of the boom 105 in preparation for rolling the boom 105 on the drum 115.

In some embodiments, one or more motors may be coupled with the inner shaft 135. The motor may rotate the inner shaft 135 to initially pull the cords 125, which flatten the boom 105, and then, after engagement of the shaft pin 145 with the drum pin 150, the motor rotates both the inner shaft 135 and the drum 115 causing the boom 105 to wrap around the drum 115. Thus, a single motion or action may change the boom 105 from the deployed configuration to the stowed configuration.

Alternatively or additionally, the inner shaft 135 may rotate in the opposite direction to deploy the boom 105. The inner shaft 135 may be rotated until, for example, the boom 105 has been fully deployed, and the shaft pin 145 engages the drum pin 150 after being rotated nearly 360 degrees. After this rotation the cords 125 may be placed in either a taut or relaxed configuration.

In some embodiments, in the deployed configuration the boom 105 has a cylindrical shape with, for example, an oval or circular cross section. The boom 105 can retain the cylindrical shape and/or the oval or circular cross section after being stowed in the stowed configuration. For example, the boom 105 may transition between flattened and rolled in the stowed configuration to being cylindrical with an oval or circular cross section in the deployed configuration using embodiments described herein. Thus, the boom 105 may retain its shape after stowage.

Figure 5:
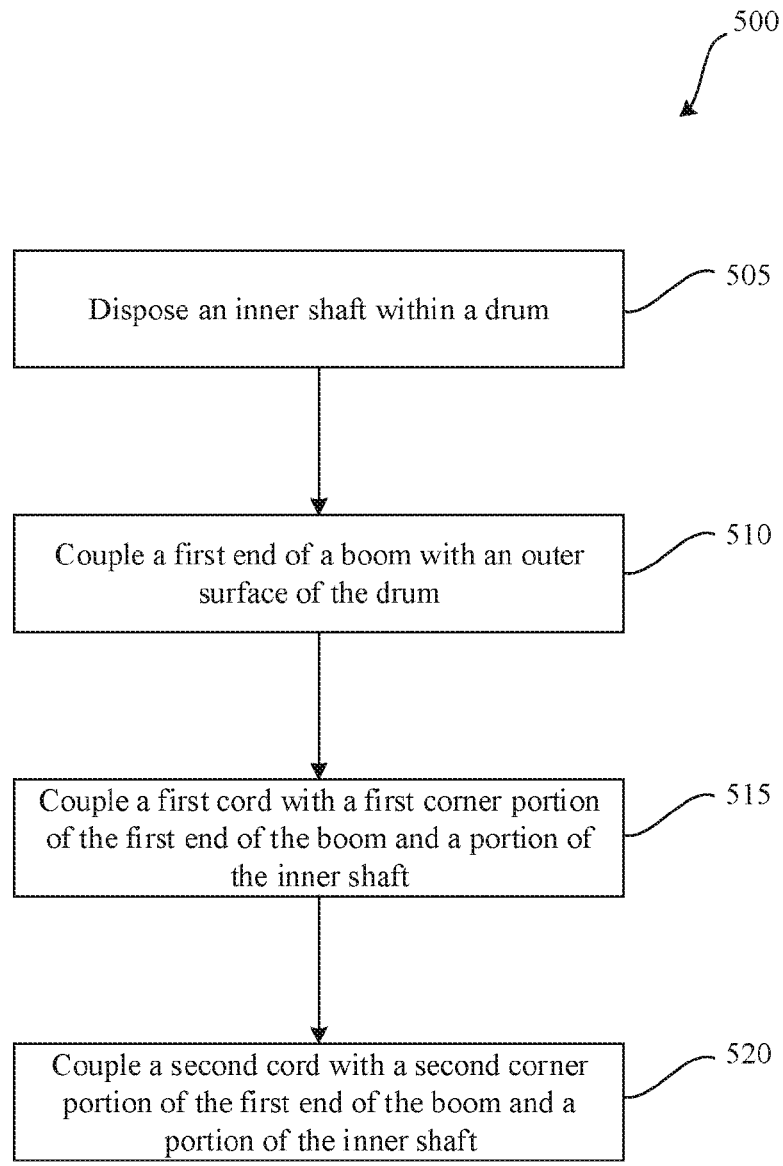
FIG. 5 is a flowchart of an example process for coupling a boom with a drum according to some embodiments.

FIG. 5 is a flowchart of an example process 500 for coupling a boom with a drum according to some embodiments. One or more steps of the process 500 may be implemented, in some embodiments, by one or more components of FIGS. 1, 2A, 2B, 4A, and 4B. Although illustrated as discrete blocks, various blocks may be divided into additional blocks, combined into fewer blocks, or eliminated, depending on the implementation.

Process 500 begins at block 505 where the inner shaft 135 may be disposed within the interior of a drum 115. In some embodiments, the inner shaft 135 and the drum 115 may be substantially parallel. In some embodiments, the inner shaft 135 may be placed within one or more bearing coupled with the drum 115 so that the inner shaft 135 may rotate relative to the drum 115. In some embodiments, the inner shaft 135 may be disposed within the center of the drum 115.

At block 510 a first end of the boom 105 may be coupled with an outer surface of the drum 115. The boom 105 may, for example, be deployed and/or extended when coupled with the drum 115. The boom 105 may include a slit that extends along a longitudinal length of the boom 105. The boom 105 may be coupled with the drum 115 with an attachment mechanism or directly with the drum 115.

At block 515 a first cord may be coupled with a first corner portion of the first end of the boom 105 and a portion of the inner shaft 135. At block 520 a second cord may be coupled with a second corner portion of the first end of the boom 105 and a different portion of the inner shaft 135. In some embodiments, the first cord and the second cord may also be disposed within a hole of the drum 115.

Figure 6:
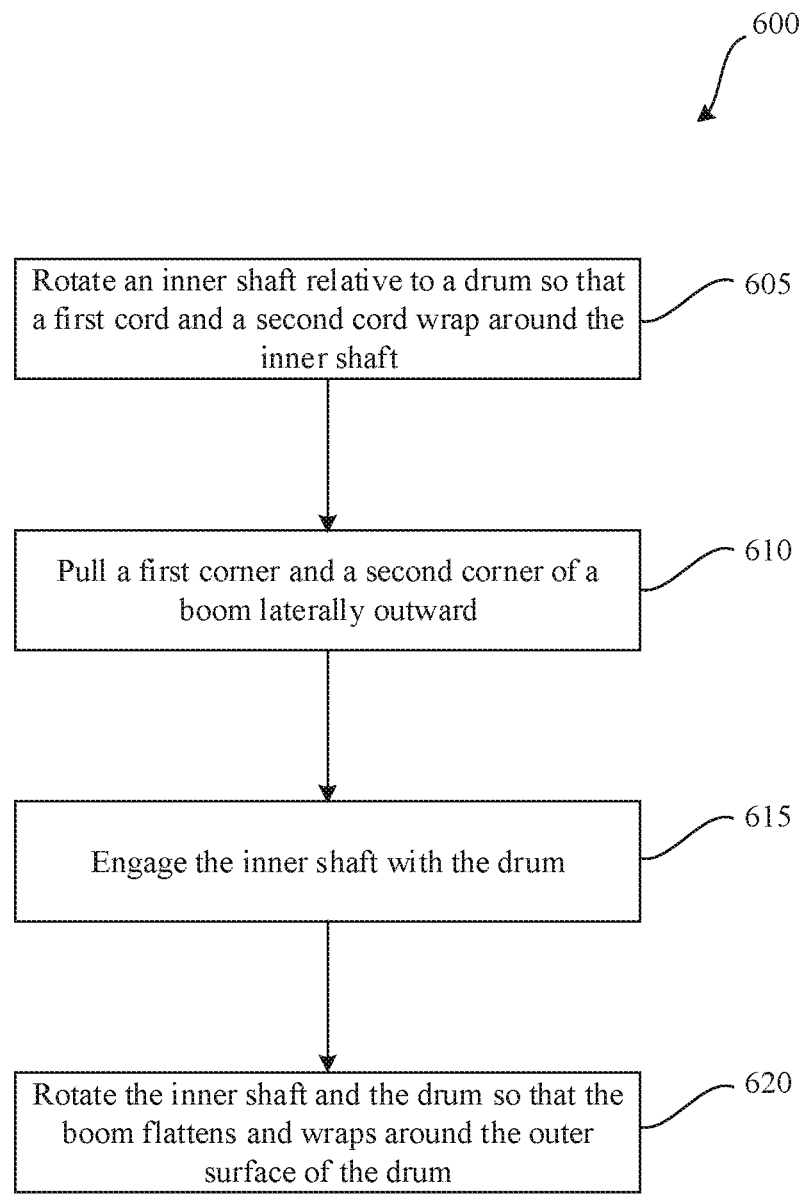
FIG. 6 is a flowchart of an example process for stowing a boom on a drum according to some embodiments.

FIG. 6 is a flowchart of an example process 600 for stowing the boom 105 on the drum 115 according to some embodiments. One or more steps of the process 600 may be implemented, in some embodiments, by one or more components of FIGS. 1, 2A, 2B, 4A, and 4B. Although illustrated as discrete blocks, various blocks may be divided into additional blocks, combined into fewer blocks, or eliminated, depending on the implementation. In some embodiments, process 600 may follow process 500 or may operate independent of process 500.

At block 605 the inner shaft 135 may be rotated relative to the drum 115. For example, the inner shaft 135 may be rotated using one or more motors, gears, pulleys, etc. The rotation of the inner shaft 135 may cause the first cord and the second cord to wrap at least partially around the inner shaft 135. The wrapping of the first cord and the second cord may produce tension in the first cord and the second cord. At block 610, the tension within the first cord and the tension within the second cord may pull a first corner and a second corner of the boom 105 laterally outward and/or begin to flatten the boom 105.

At block 615 the drum 115 may be engaged with the inner shaft 135 at some point in the rotation of the inner shaft 135 causing the drum 115 to rotate with the inner shaft 135. At block 620 the inner shaft 135 and the drum 115 may rotate so that the boom 105 may wrap around an outer surface of the drum 115. The process 600 may end when the boom 105 is wrapped and/or stowed around the drum 115 or when the motor stops rotating the inner shaft 135.

In some embodiments, a stowed boom can be deployed by reversing the rotation of the inner shaft, which after a rotation less than a full rotation, may re-engage the drum pin and cause the drum to rotate. As the drum rotates the boom may unroll from the drum. As the boom unrolls from the drum, it may unflatten and regain its cross sectional shape as it extends away from the drum.

In some embodiments, the term "substantially" is meant to mean within 5% or 10% of the value referred to mean that the value is within manufacturing tolerances.

Numerous specific details are set forth herein to provide a thorough understanding of the claimed subject matter. However, those skilled in the art will understand that the claimed subject matter may be practiced without these specific details.

In other instances, methods, apparatuses, or systems that would be known by one of ordinary skill have not been described in detail so as not to obscure claimed subject matter.

The use of the terms "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A system comprising:
    a boom having a first end, a second end, a longitudinal length that extends from the first end to the second end, and a slit that extends along the longitudinal length of the boom;
    a drum having an elliptic cross section and a longitudinal length;
    an attachment mechanism coupled with the first end of the boom and the drum such that the boom and the drum are substantially perpendicular relative to one another;
    an inner shaft having a longitudinal length, the inner shaft disposed within the drum, the longitudinal length of the inner shaft is aligned substantially parallel with the longitudinal length of the drum, the inner shaft at least partially rotatable relative to the drum, and the inner shaft is at least partially rotatable with the drum; and
    at least two cords coupled with the inner shaft and portions of the boom near the first end of the boom.

2. The system according to claim 1, wherein the attachment mechanism couples the boom directly with the drum.

3. The system according to claim 1, wherein the boom comprises an elongated member with a circular, elliptical, or semi-circular cross section.

4. The system according to claim 1, wherein the boom includes a deployed configuration such that the boom is extended along the longitudinal length of the boom.

5. The system according to claim 1, wherein the boom includes a stowed configuration such that the boom is flattened and rolled on the drum.

6. The system according to claim 1, further comprising a drum pin coupled with the drum and an inner shaft pin coupled with the inner shaft, wherein the inner shaft rotates relative to the drum until the inner shaft pin engages the drum pin whereupon the drum rotates with the inner shaft.

7. The system according to claim 1, wherein the drum comprises at least two holes and each of the two cords pass through one of the two holes in the drum.

8. The system according to claim 1, wherein the boom comprises a composite material.

9. The system according to claim 1, wherein the boom comprises a first slit edge that extends along the longitudinal length of the boom along the slit of the boom, a second slit edge that extends along the longitudinal length of the boom along the slit of the boom, wherein each of the two cords are coupled with a slit edge of the boom.

* * * * *